US007177446B2

(12) United States Patent
Magarey

(10) Patent No.: US 7,177,446 B2
(45) Date of Patent: Feb. 13, 2007

(54) VIDEO FEATURE TRACKING WITH LOSS-OF-TRACK DETECTION

(75) Inventor: Julian Frank Andrew Magarey, Cremorne (AU)

(73) Assignee: Canon Kabushiki Kaisha, Tokyo (JP)

(*) Notice: Subject to any disclaimer, the term of this patent is extended or adjusted under 35 U.S.C. 154(b) by 696 days.

(21) Appl. No.: 10/207,140

(22) Filed: Jul. 30, 2002

(65) Prior Publication Data

US 2003/0053661 A1 Mar. 20, 2003

(30) Foreign Application Priority Data

Aug. 1, 2001 (AU) .................................... PR6762

(51) Int. Cl.
  G06K 9/00 (2006.01)
  G06K 9/36 (2006.01)
  G06K 9/46 (2006.01)
  H04N 5/225 (2006.01)
(52) U.S. Cl. ...................... 382/103; 382/107; 382/190; 382/264; 382/280; 348/169
(58) Field of Classification Search ................ 382/103, 382/107, 190, 264, 280; 348/169
  See application file for complete search history.

(56) References Cited

U.S. PATENT DOCUMENTS 4,270,143 A 5/1981 Morris ........................ 358/125
4,868,871 A 9/1989 Watson, III .................... 382/1

(Continued)

FOREIGN PATENT DOCUMENTS

EP 1 265 195 12/2002

(Continued)

OTHER PUBLICATIONS

Matsuzawa, Y.; Kumazawa, I., "Object Tracking with Shape Representation Network Using Color Information", Sep. 10-13, 2000, IEEE, Proceedings. International Conference on Image Processing, vol. 3, pp. 94-97.*

(Continued)

Primary Examiner—Bhavesh M. Mehta
Assistant Examiner—Anthony Mackowey
(74) Attorney, Agent, or Firm—Fitzpatrick, Cella, Harper & Scinto

(57) ABSTRACT

A method (500, 600) of tracking a feature (201) across a sequence of image frames is disclosed. A current feature position in a current frame is estimated from at least a previous feature position in a previous frame. Feature data is extracted from pixel data of the current frame. The feature data is then compared with reference data. If a difference between the feature data and the reference data is larger than a predetermined number, then track of the feature (201) has been lost. Alternatively, the current feature position is appended to the trajectory of the feature, and the reference data is updated periodically with feature data of a plurality of frames. Preferably the reference data is a statistical representation of feature data of the plurality of frames.

26 Claims, 7 Drawing Sheets

U.S. PATENT DOCUMENTS

| | | | | |
|---|---|---|---|---|
| 5,285,573 | A | 2/1994 | LeMonds et al. | 29/889.72 |
| 5,355,163 | A * | 10/1994 | Tomitaka | 348/234 |
| 5,473,369 | A | 12/1995 | Abe | 348/169 |
| 5,719,951 | A * | 2/1998 | Shackleton et al. | 382/118 |
| 5,754,676 | A * | 5/1998 | Komiya et al. | 382/132 |
| 5,757,422 | A * | 5/1998 | Matsumura | 348/169 |
| 5,867,584 | A | 2/1999 | Hu et al. | 382/103 |
| 5,923,365 | A | 7/1999 | Tamir et al. | 348/169 |
| 6,067,369 | A * | 5/2000 | Kamei | 382/125 |
| 6,075,557 | A | 6/2000 | Holliman et al. | 348/51 |
| 6,088,468 | A * | 7/2000 | Ito et al. | 382/103 |
| 6,192,156 | B1 | 2/2001 | Moorby | 382/236 |
| 6,236,749 | B1 * | 5/2001 | Satonaka et al. | 382/154 |
| 6,771,833 | B1 * | 8/2004 | Edgar | 382/254 |
| 2002/0106119 | A1 * | 8/2002 | Foran et al. | 382/133 |

FOREIGN PATENT DOCUMENTS

JP  11-331829  11/1999

OTHER PUBLICATIONS

F.G. Meyer and P. Bouthemy, "Region-Based Tracking Using Affine Motion Models in Long Image Sequences", CVGIP: Image Understanding, vol. 60(2), Sep. 1994, pp. 119-140.

Abridgement, Australian Patent Application No. AU 2002300345 B2 (Sep. 2, 2004).

* cited by examiner

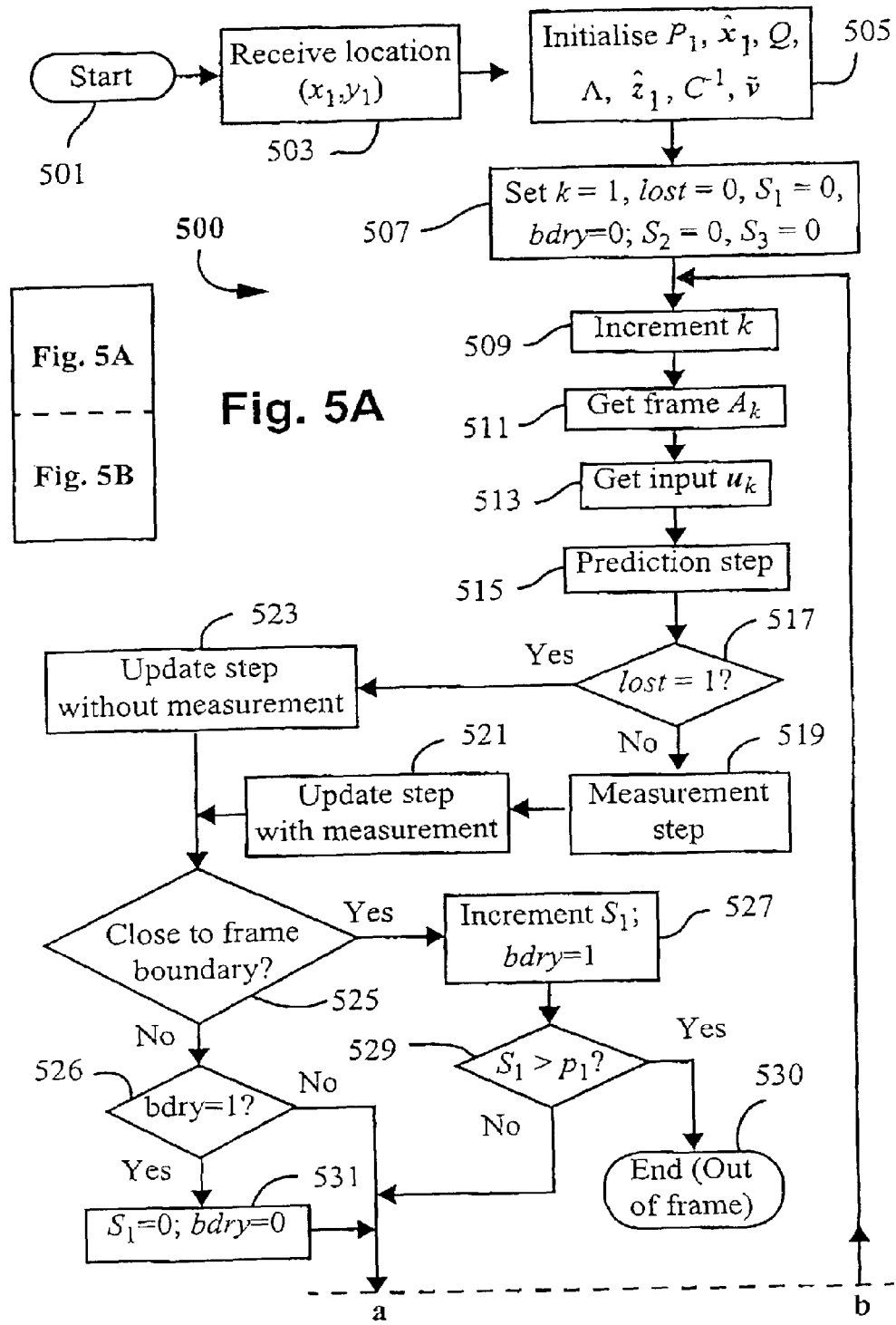

VIDEO FEATURE TRACKING WITH LOSS-OF-TRACK DETECTION

TECHNICAL FIELD OF THE INVENTION

The present invention relates generally to digital video analysis and, in particular, to the task of tracking a feature over a sequence of video frames.

BACKGROUND ART

Feature tracking is an important task in the field of digital video analysis. Digital video consists of a sequence of two-dimensional arrays, known as frames, of sampled intensity values, known as picture elements or pixels. A feature may be defined as a pattern of pixels in such a frame. Given the location of a feature of interest in one frame, the aim of feature tracking is then to determine the location of that feature in other, usually subsequent frames. That is, a trajectory for the selected feature must be found with respect to the coordinate system of the camera used to capture the sequence of frames.

The feature is typically selected through some intervention by a human user, usually by directing a pointing device at the feature displayed as part of an image on a screen. The feature may also be selected through an automatic detection process which, by using some predefined criteria, selects a feature that corresponds to such criteria.

If the selection is performed in real time, feature tracking may be used for controlling some other variable, such as the pointing direction of a sensor such as a camera, by feeding the results to a control system. In such applications, speed is of the utmost importance. Other applications use feature trajectories in post-processing tasks such as adding dynamic captions or other graphics to the video. Speed is less important in such applications.

There are two broad categories of feature tracking. A first approach, sometimes known as centroid tracking, requires the feature or object to be clearly distinguishable from the background in some sensing modality. An example of this first category is the tracking of movement of people across a fixed, known scene, in a surveillance application. In this case, a detection process may be employed independently in each frame to locate one or more objects. The task of tracking is to associate these locations into coherent trajectories for one or more of the detected objects as they interact with one another.

The second category may be referred to as motion-based or correlation tracking. In this case there is no separate detection process, and the location of the feature in the current frame must be found by reference to its position in the previous frame. This is a more general category with wider application, since there are fewer restrictions on the nature of the scene. The present disclosure falls into this category.

A critical step in the second approach is motion estimation, in which a region is sought in the current frame that is most similar to the region surrounding the feature in the previous frame. There exist many approaches to motion estimation including search and match, optical flow, and fast correlation among others, and all are potentially applicable to motion-based tracking. Because these methods have various limitations in terms of speed and reliability, many systems use some form of predictive tracking, whereby the trajectory over previous frames is extrapolated to predict the location of the feature in the current frame. If the trajectory is accurate, only a small correction to the predicted position need be found by the motion estimation process; potentially reducing computation and increasing reliability. The Kalman filter is an example of a predictive tracking strategy which is optimal under certain estimation error assumptions. An estimated motion vector is the "measurement" which enables correction of the current prediction. If the camera is moving between frames, and this motion may somehow be independently estimated, the camera motion may be compensated for in forming the prediction. This also helps to reduce the reliance on motion vector accuracy.

The main disadvantage of motion-based tracking in complex dynamic scenes with cluttered backgrounds arises from the lack of a separate detection stage. The feature may be occluded by another object, or suddenly change course, so that predictive motion estimation fails and tracking is lost. In these cases, tracking should be halted and the system notified of the "loss-of-track" (LOT) condition. However, the nature of motion estimation is such that a vector is always returned whether or not the feature is still actually visible near the predicted position. Hence, detecting the LOT condition requires some extra checking after the connection to the predicted position.

Most commonly, the region surrounding the current feature position is compared with stored reference data in some domain, and if that region is sufficiently different, an LOT condition is flagged. The reference data is initially derived from the region around the feature in the frame in which the feature was selected. Previous approaches have either kept the reference data fixed while tracking, or updated it continuously with the contents of the previous frame. Using a "goodness of fit" measure supplied by the motion estimation itself—for example, the height of a correlation peak—as the LOT criterion, is equivalent to the second approach, that is, comparing the region surrounding the current feature position with the region surrounding the feature position in the previous frame.

However, both these approaches, which may be viewed as opposite extremes of adaptivity, have disadvantages. Keeping the reference data fixed means the associated feature tracking system is unable to adapt to gradual but superficial changes in the appearance of the feature as it, for example, rotates in depth or undergoes lighting changes. Consequently, a LOT condition will be flagged prematurely. On the other hand, continual updates of the reference data can make such a feature tracking system too robust, causing it to fail to detect an insidious but fundamental change in the feature surrounds. Such a situation often occurs when a feature is occluded by another object.

SUMMARY OF THE INVENTION

It is an object of the present invention to substantially overcome, or at least ameliorate, one or more disadvantages of existing arrangements.

According to a first aspect of the invention, there is provided a method of tracking a feature across a sequence of image frames, each said image frame comprising a two-dimensional array of pixel data, said method comprising the steps of:

(a) estimating a current feature position in a current frame from at least a previous feature position in a previous frame;

(b) extracting feature data from pixel data of said current frame that are substantially around said current feature position;

(c) comparing said feature data with reference data, wherein a difference between said feature data and said reference data that is larger than a first predetermined number indicates that track of said feature has been lost; and (d) updating said reference data periodically with feature data of a plurality of frames.

According to a second aspect of the invention, there is provided an apparatus for tracking a feature across a sequence of image frames, each said image frame comprising a two-dimensional array of pixel data, said apparatus comprising:

means for estimating a current feature position in a current frame from at least a previous feature position in a previous frame;

means for extracting feature data from pixel data of said current frame that are substantially around said current feature position;

means for comparing said feature data with reference data, wherein a difference between said feature data and said reference data that is larger than a first predetermined number indicates that track of said feature has been lost; and means for updating said reference data periodically with feature data of a plurality of frames.

Other aspects of the invention are also disclosed.

BRIEF DESCRIPTION OF THE DRAWINGS

One or more embodiments of the present invention will now be described with reference to the drawings, in which:

FIGS. 5A and 5B show a flow diagram of a feature tracking method; and

DETAILED DESCRIPTION INCLUDING BEST MODE

Figure 1:
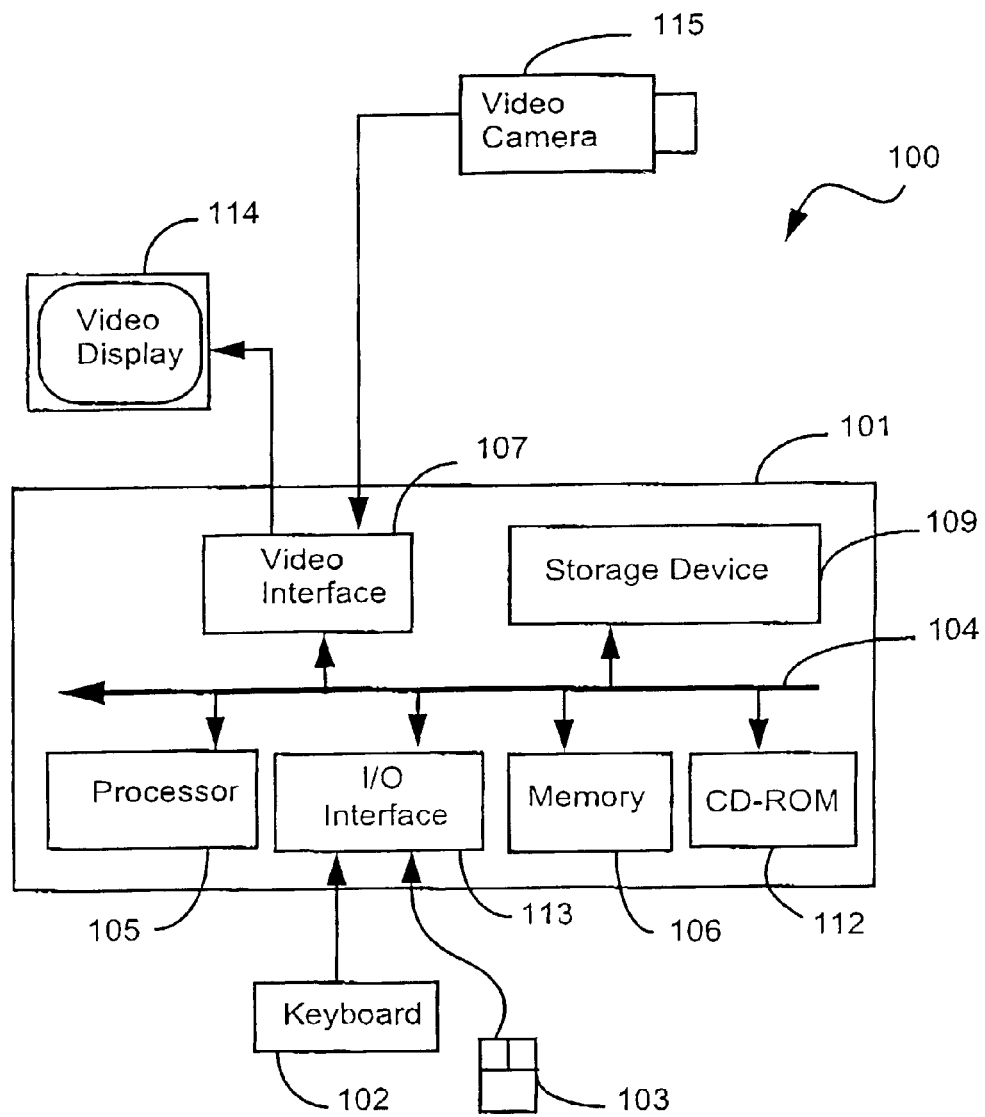
FIG. 1 is a system block diagram of a feature tracking system.

Some portions of the description which follows are explicitly or implicitly to presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that the above and similar terms are to be associated with the appropriate physical quantities and are merely convenient labels applied to these quantities. Unless specifically stated otherwise, and as apparent from the following, it will be appreciated that throughout the present specification, discussions utilizing terms such as "calculating", "determining", "replacing", "generating" "initializing", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers or other such information storage, transmission or display devices.

Where reference is made in any one or more of the accompanying drawings to steps and/or features, which have the same reference numerals, those steps and/or features have for the purposes of this description the same function(s) or operation(s), unless the contrary intention appears.

FIG. 1 shows a schematic block diagram of a system upon which feature tracking can be practiced. The system 100 comprises a computer module 101, such as a conventional general-purpose computer module, input devices including a video camera 115, a keyboard 102 and pointing device 103, and output devices including a display device 114.

The computer module 101 typically includes at least one processor unit 105, a memory unit 106, input/output (I/O) interfaces including a video interface 107 for the video display 114 and the video camera 115, and an I/O interface 113 for the keyboard 102 and the pointing device 103. A storage device 109 is provided and typically includes a hard disk drive and a floppy disk drive. A CD-ROM drive 112 is typically provided as a non-volatile source of data. The components 105 to 113 of the computer module 101, typically communicate via an interconnected bus 104 and in a manner which results in a conventional mode of operation of the computer module 101 known to those in the relevant art.

The feature tracking method 500, described with reference to FIG. 5, may be performed on "live" video data. Such "live" video data may be captured by the video camera 115, forming a sequence of two-dimensional frames $A_k$ of sampled pixels. A frame $A_k$, captured at time k measured in frame intervals, consists of a rectangularly sampled grid of values, with each value representing the intensity of light falling onto a corresponding element of an image plane sensor of the video camera 115. The data for the frames $A_k$ is stored on the storage device 109 or memory unit 106 as a two-dimensional array of size L columns by R rows. The location of a pixel x columns from the left border of the frame $A_k$ and y rows down from the top border is denoted as $(x_k, y_k)$ The value may be a scalar value representing overall intensity, or a vector value representing the intensities of different colour components.

The video data, which may be derived directly from the video camera 115, or from playback of stored data, is displayed on the video display 114 under control of the processor 105. A user uses the pointing device 103 to point to a feature to be tracked that is displayed on the display 114, thereby establishing the location of the feature in an initial frame $A_1$ as $(x_1, y_1)$. Alternatively, selection of a feature to be tracked may be by an automatic detection process.

The description that follows assumes tracking is to take place forward in time from the initial frame $A_1$ from which the feature to be tracked was selected. However, if a stored sequence of frames $A_k$ is being analysed the tracking may well be carried out backwards in time from the selection frame $A_1$.

The aim of feature tracking, given the sequence of frames $A_1, A_2, \ldots$, is to estimate the position coordinates $(x_k, y_k)$ of the feature at each frame interval k for as long as the feature corresponding to the selected position $(x_1, y_1)$, which typically forms part of a real-world object, remains visible to the camera 115. It is noted that the feature tracking method 500 set out below may be applied simultaneously to any number of selected features. However, for simplicity it shall be assumed that only a single feature is being tracked.

Kalman Tracking Formulation

The Kalman-based formulation of the tracking problem follows. Kalman filtering is a well-known method of estimating dynamic parameters of a linear system under conditions of imperfect observation. Such filtering is formulated to provide an optimum estimate of the state of the system given all the previous and current observations at any time, under certain assumptions about observation errors. Although those assumptions are not met in the case of general feature tracking, and in particular the assumption that the observation error is Gaussian in statistical font, a departure from those assumptions does not critically affect the performance of feature tracking using Kalman filtering.

A zero-order model state vector $x_k$ (of length 2) for the system 100 at time k may be set to $x_k = [x_k\ y_k]^T$. In the preferred implementation a first-order model is used for the state vector $x_k$ having a length of 4, and which explicitly includes feature velocity as independent variables as follows:

$$x_k = \begin{bmatrix} x_k \\ y_k \\ \dot{x}_k \\ \dot{y}_k \end{bmatrix} \quad (1)$$

Under such a first-order model, if the feature is moving with a constant velocity relative to the boundary of the frames, minimal measurement corrections should be required.

It is assumed that the state of the system 100, represented by the state vector $x_k$, evolves linearly with time k (in frame intervals) as follows:

$$x_k = D x_{k-1} + B u_k + s_k \quad (2)$$

where;

D is the 4 by 4 system evolution matrix, given by $$D = \begin{bmatrix} 1 & 0 & 1 & 0 \\ 0 & 1 & 0 & 1 \\ 0 & 0 & 1 & 0 \\ 0 & 0 & 0 & 1 \end{bmatrix} \quad (3)$$

$s_k$ is the "process noise", assumed to be drawn from a zero-mean Gaussian distribution with 4 by 4 covariance matrix Q:

$$s_k \sim N(0, Q) \quad (4)$$

$u_k$ is the 2-vector of "inputs", i.e. the displacement at pixel $(x_k, y_k)$ of frame $A_k$ induced by camera operation (panning, tilting, zooming):

$$u_k = \begin{bmatrix} u_k \\ v_k \end{bmatrix} \quad (5)$$

and B is the (4 by 2) input matrix:

$$B = \begin{bmatrix} 1 & 0 \\ 0 & 1 \\ 0 & 0 \\ 0 & 0 \\ 0 & 0 \end{bmatrix} \quad (6)$$

It is assumed that the camera-operation-induced displacement $u_k$ is provided by an external process. If it is not provided, the algorithm may still proceed with the displacement $u_k$ set to zero for all k, but greater strain will be placed on the motion estimator in this case if the camera is indeed being operated, particularly if the operation changes erratically from frame to frame.

The system state $x_k$ may not be observed directly. Instead, the system state $x_k$ can be estimated through a linear measurement step as follows:

$$z_k = H x_k + e_k \quad (7)$$

where:

$z_k$ is the 2-vector of position measurements obtained by motion estimation as described below;

H is the (2 by 4) position measurement matrix $$H = \begin{bmatrix} 1 & 0 & 0 & 0 \\ 0 & 1 & 0 & 0 \end{bmatrix} \quad (8)$$

and $e_k$ is the "measurement noise", assumed to be drawn from a zero-mean Gaussian distribution with (2 by 2) covariance matrix $\Lambda$:

$$e_k \sim N(0, \Lambda) \quad (9)$$

The Kalman tracking algorithm is a recursive process carried out on each frame $A_k$ from time interval k=2 onwards. The aim is to produce an estimate of the state vector $\hat{x}_k$ from a previous estimate $\hat{x}_{k-1}$, the current input $l_k$, and the current measurement $z_k$. An additional output at each time interval k is all estimate $P_k$ of the (4 by 4) covariance matrix of the state estimation error $(x_k - \hat{x}_k)$.

To initialise the Kalman tracking process, the initial state estimate $\hat{x}_1$ and initial covariance matrix of the state estimation error $P_1$ must be specified. The former comes from the initial feature location:

$$\hat{x}_1 = \begin{bmatrix} x_1 \\ y_1 \\ 0 \\ 0 \end{bmatrix} \quad (10)$$

Because the first two components of the initial state estimate $\hat{x}_1$, comprising the initial location $(x_1, y_1)$, are known exactly, while the velocity estimates, which are set to zero, are independent but uncertain, the initial covariance matrix of the state estimation error $P_1$ is set to $$P_1 = \begin{bmatrix} 0 & 0 & 0 & 0 \\ 0 & 0 & 0 & 0 \\ 0 & 0 & \sigma^2 & 0 \\ 0 & 0 & 0 & \sigma^2 \end{bmatrix} \quad (11)$$

where $\sigma^2$ is the initial velocity variance.

The other quantities required upon initialisation are the process noise and measurement noise covariance matrices Q and Λ. Because the variables of the state vector $x_k$ and measurements $z_k$ are independent, the process noise and measurement noise covariance matrices Q and Λ may be assumed to be diagonal matrices. The values on the diagonals of the process noise covariance matrice Q, the measurement noise covariance matrices Λ, and the initial covariance matrix of the state estimation error $P_1$ mainly affect the speed of initial "locking": the larger they are, the slower the response of the algorithm.

The initialisation is followed by the prediction of the state vector $\hat{x}_k$ and the covariance matrix of the state estimation error $P_k$ as follows:

$$\hat{x}_k^- = D\hat{x}_{k-1} + Bu_k \quad (12)$$

$$P_k^- = DP_{k-1}D^T + Q \quad (13)$$

where the "−" superscript indicates these are prior estimates, made without reference to the current measurement $z_k$. The system evolution matrix D and the input matrix B are constants as set out in Equations (3) and (6) respectively.

Prediction is followed by a measurement update step wherein the predictions of the state vector $\hat{x}_k^-$ and the covariance matrix of the state estimation error $P_k^-$ are updated with the current measurement $z_k$ as follows:

$$K_k = P_k^- H^T (HP_k^- H^T + \Lambda)^{-1} \quad (14)$$

$$\hat{x}_k = \hat{x}_k^- + K_k(z_k - H\hat{x}_k^-) \quad (15)$$

$$P_k = (I_4 - K_k H)P_k^- \quad (16)$$

wherein $K_k$ is known as the Kalman gain matrix (4 by 2), and $I_4$ is the (4 by 4) identity matrix. The position measurement matrix H is a constant as set out in Equation (8).

The method used to obtain the current feature position measurement $z_k$ for use in Equation (15) is based on estimating the motion of a small window $W_{k-1}$ centred on the estimated feature position $\hat{z}_{k-1}$ in the previous frame $A_{k-1}$. The best estimate of the previous feature position measurement $\hat{z}_{k-1}$ is given by $$\hat{z}_{k-1} = H\hat{x}_{k-1}. \quad (17)$$

Figure 2A:
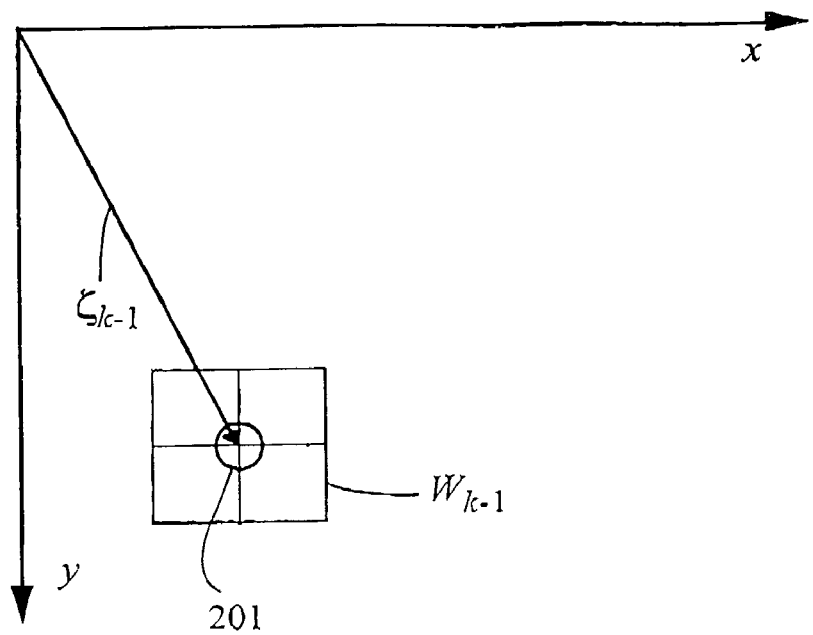
FIG. 2A is a graphical illustration of a rounded previous feature position measurement estimate from a previous frame and the small window centred on that estimate.

As the previous feature position measurement $\hat{z}_{k-1}$ is real valued, but the position coordinate system used comprises a discrete grid of positions, the previous feature position measurement $\hat{z}_{k-1}$ must be rounded as:

$$\zeta_{k-1} = [\hat{z}_{k-1}] \quad (18)$$

where [ ] indicates a rounding operation. The feature 201, with its rounded position measurement estimate $\zeta_{k-1}$ and the small window $W_{k-1}$ are illustrated in FIG. 2A.

The window $W_{k-1}$ should be as small as possible, to exclude background clutter from the measurement $z_k$, while still containing sufficient detail to enable a reasonable measurement estimate $\hat{z}_k$ to be obtained. In the preferred implementation, the window $W_{k-1}$ is square, with power-of-two size w in rough proportion to the frame size, being R rows by L columns, as follows:

$$w = 2^{[log2(min(R,L))]-4} \quad (19)$$

rounded down to a minimum size of eight.

The current feature position measurement $z_k$ is that which satisfies the following:

$$A_{k-1}(\hat{z}_{k-1}) = A_k(z_k) \quad (20)$$

One option for finding a feature position measurement $z_k$ that satisfies Equation (20) is to use a search-and-match technique. That is, the pixel values in the previous feature window $W_{k-1}$ are compared with a number of candidate windows surrounding a predicted position measurement $\hat{z}_k$ in the current frame $A_k$ using some similarity criterion. The candidate window with the best match is selected, and the centre of that selected candidate window will provide the current position measurement $z_k$. However, such a search-and-match technique for finding a feature position measurement $z_k$ is laborious and time-consuming. Moreover, the correction from the predicted position measurement $\hat{z}_k$ to the position measurement $z_k$ is limited in precision by the number of search candidate windows compared.

In the preferred implementation, a motion vector $f_k$ is estimated directly, with the motion vector $f_k$ being a correction to the predicted position measurement $\hat{z}_k$ to obtain the actual feature position measurement $z_k$, using a fast algorithm such as phase correlation. In principle the correction $f_k$ is of infinite precision, i.e. real-valued, though rounding errors and noise limit the precision in practice.

The estimated state vector $\hat{x}_k^-$, as calculated in Equation (12), is used to obtain the current prediction of the feature position $\hat{z}_k$:

$$\hat{z}_k = H\hat{x}_k^- \quad (21)$$

Figure 2B:
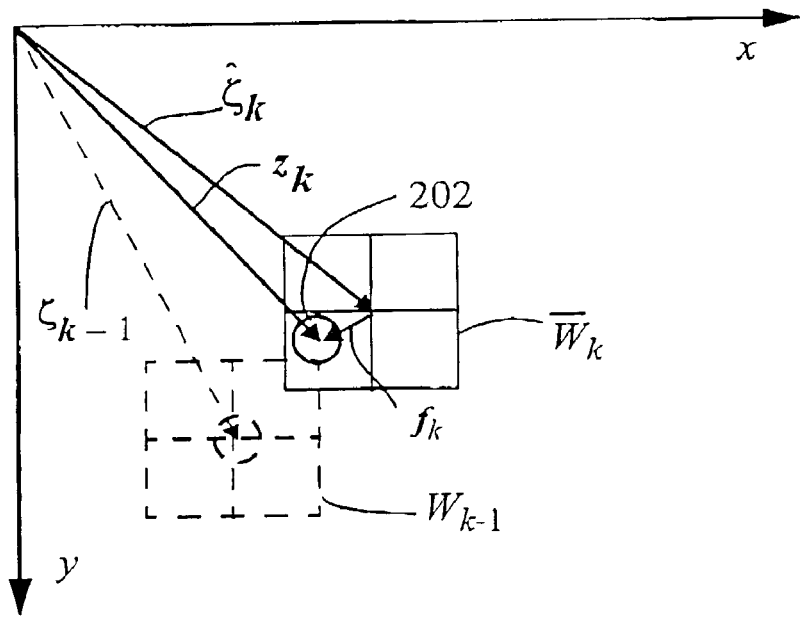
FIG. 2B is a graphical illustration of a rounded predicted position measurement, a window centred on that predicted position measurement, and a motion vector as correction to obtain a current position measurement.

Again the predicted position measurement $\hat{z}_k$ must be rounded to the nearest integer as follows:

$$\hat{\zeta}_k = [\hat{z}_k] \quad (22)$$

to be used as the centre of the window $\overline{W}_k$ to be extracted from frame $A_k$. That is, $$\overline{W}_k(\xi) = A_k(\xi + \hat{\zeta}_k) \quad (23)$$

for integer components of position $\xi$ in the range [−w/2, w/2 −1] relative to the window centre. FIG. 2B shows the frame $A_k$ with the rounded predicted position measurement $\hat{\zeta}_k$ and the window $\overline{W}_k$ illustrated. The previous window $W_{k-1}$ from the previous frame $A_{k-1}$ is also illustrated.

Similarly, the pixel values of window $W_{k-1}$ are extracted from the previous frame $A_{k-1}$ centred on the rounded previous position $\zeta_{k-1}$, i.e.

$$W_{k-1}(\xi) = A_{k-1}(\xi + \zeta_{k-1}) \quad (24)$$

Having extracted the pixel values of the windows $W_{k-1}$ and $\overline{W}_k$ from the previous and current frames $A_{k-1}$ and $A_k$, the windows $W_{k-1}$ and $\overline{W}_k$ are passed as input to a fast motion estimation algorithm. The result is a motion vector $f_k$ which approximately satisfies the following:

$$\overline{W}_k(\xi + f_k) = W_{k-1}(\xi) \quad (25)$$

Combining Equations (20), (23), (24), and (25), the current position measurement $z_k$ may be obtained as $$z_k = \hat{z}_{k-1} + f_k + \hat{\zeta}_k - \zeta_{k-1} \quad (26)$$

The motion vector $f_k$ and the current position measurement $z_k$, which is an estimate of the position of the feature 202, are also illustrated in FIG. 2B.

Conventional Kalman tracking proceeds by incrementing time interval k, obtaining a new frame $A_k$, and alternating the prediction and measurement update stops set out above in relation to Equations (12) to (16) and (26).

Checking for Frame Boundary

Once the estimated state vector $\hat{x}_k^-$ has been corrected using the position measurement $z_k$ in Equation (15), a current "filtered" feature position may be obtained as:

$$\begin{bmatrix} \hat{x}_k \\ \hat{y}_k \end{bmatrix} = H\hat{x}_k \quad (27)$$

The current estimated feature position $[\hat{x}_k, \hat{y}_k]^T$ is then checked to see if it is "too close" to the boundary of the current frame $A_k$. In the preferred implementation, it is determined that the feature position $[\hat{x}_k, \hat{y}_k]^T$ is too close to the boundary of the frame $A_k$ when an edge of the window $W_k$ around the feature position $[\hat{x}_k, \hat{y}_k]^T$ touches the boundary of the frame $A_k$. If the feature position $[\hat{x}_k, \hat{y}_k]^T$ is determined to be too close, tracking may still continue for a small number of frames. This allows for continued tracking of a feature that temporarily moves near the frame boundary without leaving the frame $A_k$ altogether. If the feature position $[\hat{x}_k, \hat{y}_k]^T$ does not move away from the frame boundary, tracking is terminated on the grounds that the feature has left the frame $A_k$.

Checking for Loss-of-Track

It needs to be determined whether the feature position estimate $[\hat{x}_k, \hat{y}_k]^T$ corresponds to the "true" position of the feature. This is done by comparing the pixel values within the w by w window $W_k$ centred on the rounded feature position $[\hat{x}_k, \hat{y}_k]^T$ in frame $A_k$ with a "reference" data set. This window $W_k$ will be referred to hereafter as the feature window $W_k$. It is determined that a Loss of Track (LOT) condition exists when the difference between pixel values of the feature window $W_k$ and the reference data set exceeds a predetermined threshold. The method of computing this difference is described below.

When a LOT condition is detected, feature tracking may continue for a limited number of frames $A_k$, allowing for track to be regained after a transient disturbance. However, the measurement update step is bypassed during such a "probation" period in that the state vector $\hat{x}_k$ is not updated with the current measurement $z_k$ (Equation (15)), but is simply made equal to the predicted state vector $\hat{x}_k^-$:

$$\hat{x}_k = \hat{x}_k^- \quad (28)$$

If track condition is regained during the probation period, normal feature tracking is resumed However, if the track is not regained during the limited number of frames $A_k$, feature tracking is halted.

The reference data is clearly crucial to the LOT detection step. Previous methods have used one of two approaches:

Obtain the reference data from a plurality of feature windows $W_k$ at the start of the feature tracking sequence, then keep the reference data fixed for all time intervals k; and Update the reference data every frame $A_k$, using the current feature window $W_k$.

However, both these approaches, which may be viewed as opposite extremes of adaptivity, have disadvantages as set out in the Background Art section.

The feature tracking system 100 finds an appropriate compromise, by updating the reference data periodically using statistics extracted from previous feature windows $W_k$. In the preferred implementation, the reference data is extracted from a set of N frames. This means that the contents of every feature window $W_k$ are compared with reference data extracted from a previous set of N feature windows. Only feature windows $W_k$ where a LOT condition is not detected are added to the set of N frames to be used for the reference data.

Figure 3:
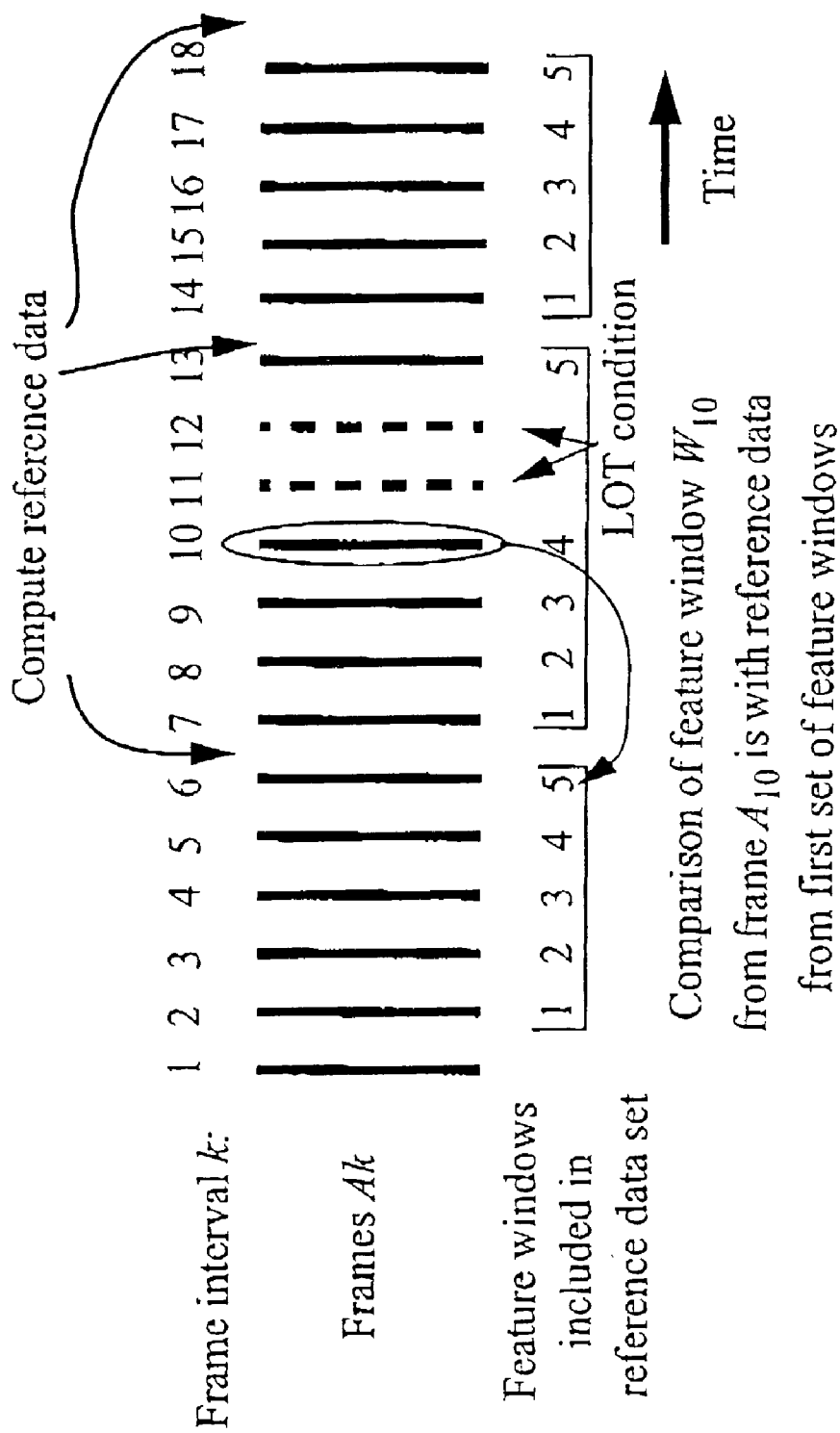
FIG. 3 is an illustration of the relationship between the position of a current frame and the frames from which reference data is generated.

FIG. 3 illustrates the relationship between the position of a current frame $A_k$ and the frames from which reference data is generated. Following the initial frame $A_j$, the feature windows $W_k$ of the next N frames $A_k$ for which a LOT condition is not detected, with N=5 in the illustration, are added to the reference set of feature windows. When the set includes N feature windows, reference data is calculated from that set. This reference data is used for comparison with feature window $W_k$ from frame $A_k$, until new reference data is calculated from the following set of N feature windows. For example, the feature window $W_{10}$ from frame $A_{10}$ is compared with the reference data from the set of 5 feature windows $\{W_2, W_3, W_4, W_5, W_6\}$. Because of a LOT condition in frames $A_{11}$ and $A_{12}$, the next set of 5 feature windows is $\{W_7, W_8, W_9, W_{10}, W_{13}\}$ from which the new reference data for use with, for example, frames $A_{14}$ and $A_{15}$ is calculated.

Feature Extraction and Comparison

In the LOT detection step, a feature vector $v_k$ is extracted from the window $W_k$, and compared with the reference data. Any combination of feature extraction and comparison criterion may be applied. The combination should have the following characteristics:

Robustness to superficial changes in the feature window $W_k$. Examples of superficial changes are global intensity changes, small translations of the feature within the window, and additive noise;

Sensitivity to fundamental changes in the feature window $W_k$, such as the intrusion of an occluding object;

Wide applicability, i.e. no need to "tune" the algorithm to a specific situation; and Computational efficiency.

Figure 4:
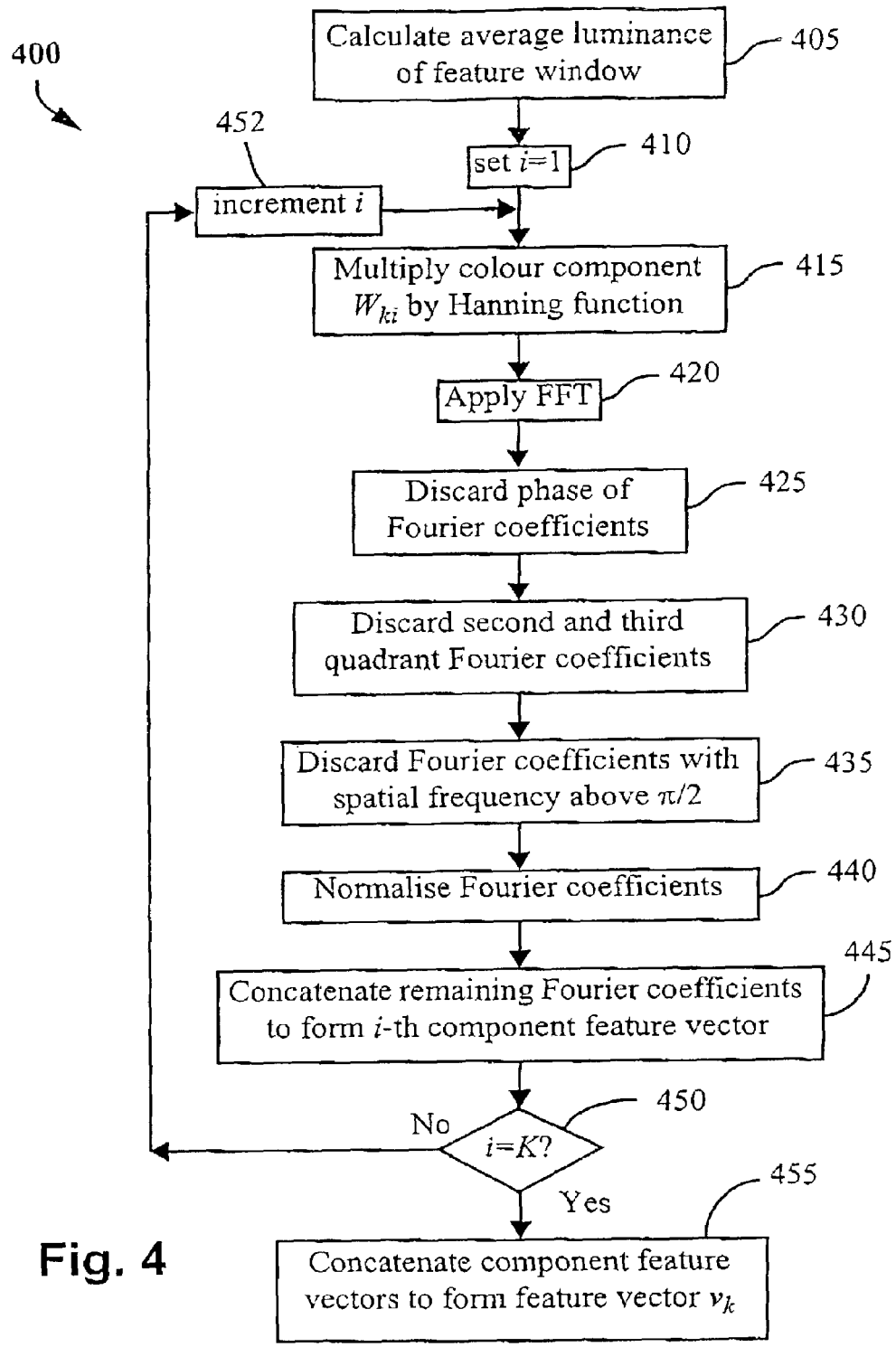
FIG. 4 is a flow diagram of a method for extracting a feature vector from the window.

The preferred method 400 for extracting the feature vector $v_k$ from the window $W_k$ is illustrated in FIG. 4, wherein the two-dimensional Fast Fourier Transform (FFT) of the feature window $W_k$ is used. Step 405 calculates the average luminance $E_k$ of the feature window $W_k$.

Step 410 sets a counter i to 1. In step 415 the i-th colour component $W_{ki}$ of feature window $W_k$ is multiplied by a two-dimensional Hanning function centred on the centre of feature window $W_k$. Next, the FFT is applied to the modified feature window $W_{ki}$ in step 420.

The phase of each complex-valued Fourier coefficient is discarded in step 425, thereby retaining only the modulus. The Fourier coefficients in the second and third quadrant of the spatial frequency plane are also discarded in step 430. Furthermore, all Fourier coefficients with a spatial frequency component greater than $\pi/2$ in either direction (horizontal and vertical) are also discarded in step 435.

The remaining Fourier coefficients are normalised in step 440 by dividing each by the average luminance $E_k$ calculated in step 405. An i-th component feature vector $v_{ki}$ is obtained in step 445 by concatenating all the remaining, normalised Fourier coefficients into a column vector $v_{ki}$. Step 450 then determines whether the counter i is equal to K, which is the number of colour components used in the frames $A_k$. If the counter i is still smaller than the number of colour components, then step 452 increments the counter i, and steps 415 to 445 are repeated to obtain the next component feature vector $v_{ki}$.

After all the component feature vectors $v_{ki}$ have been obtained, the method 400 continues to step 455 where all vectors $v_{ki}$ are concatenated into a single column vector $v_k$ to produce the feature vector $v_k$. The feature vector $v_k$ has length M given by:

$$M = K \cdot \frac{w^2}{8} \tag{29}$$

The method 400 also ends in step 455.

The choices implemented into method 400 were made to meet the criteria of sensitivity, robustness, and efficiency listed above. In particular:

The Fourier transform moduli are invariant under small spatial shifts in the window contents;

The Hanning function emphasises the pixels near the centre of the window at the expense of those near the edge, to reduce the effect of background clutter;

The pixel values of the window are real-valued, so the second and third quadrants of the spatial frequency plane contain redundant information and may be discarded for efficiency (discarding may be effected by discarding (a) either of the first or third quadrant coefficients and (b) either of the second or fourth quadrant coefficients);

The typical Fourier-domain content of real scenes is concentrated at low spatial frequencies, so the higher frequency components (those above half-band, or $\pi/2$) may be discarded to reduce the effect of noise; and Normalisation by average luminance removes the effect of global luminance changes as a result of, for example, changes in lighting conditions.

In the preferred implementation the Mahalanobis distance is used as the comparison criterion. The Mahalanobis distance of the feature (column) vector $v_k$ from a reference distribution is given by:

$$t_k = \sqrt{(v_k - \bar{v})^T C^{-1} (v_k - \bar{v})} \tag{30}$$

where $\bar{v}$ and C are the mean feature vector and covariance matrix of the distribution of the reference set of N feature windows. These are computed at intervals shown in FIG. 3, using the following two equations. Compute the mean feature vector $\bar{v}$ as:

$$\bar{v} = \frac{1}{N} \sum_{k=1}^{N} v_k \tag{31}$$

and the covariance matrix C as:

$$C = \varepsilon I_M + \frac{1}{N-1} \sum_{k=1}^{N} (v_k - \bar{v})(v_k - \bar{v})^T \tag{32}$$

where $\varepsilon$ is a small positive number. The first term is present to ensure the covariance matrix C is invertible in extreme cases, while not affecting the values of the covariance matrix C significantly in other cases. During the first N frames after the first (assuming no LOT condition occurs during the first N frames), the invented covariance matrix $C^{-1}$ is set to zero, so that the Mahalanobis distance $t_k$ evaluates to zero.

The Mahalanobis distance $t_k$ is a normalised Euclidean vector distance, where each component of the difference $(v_k - \bar{v})$ is weighted inversely according to the variance of the associated component over the set of N feature windows. In the one-dimensional case, i.e. when the length M of the feature vector $v_k$ is one, the Mahalanobis distance $t_k$ is simply the number of standard deviations a given number lies away from the mean. As such, it is statistically based and may be compared with a constant threshold over a wide variety of feature extraction techniques.

Complete Feature Tracking Method

FIG. 5 is a flowdiagram of a feature tracking method 500 for estimating the position coordinates $(x_k, y_k)$ of the feature at each frame interval k, given the sequence of frames $A_1$, $A_2$, ..., and the selected position $(x_1, y_1)$, thereby forming a trajectory. The method 500 is implemented in the feature tracking system 100 (FIG. 1) as an application program which is resident on the hard disk drive 110 and read and controlled in its execution by the processor 105. Intermediate storage of the program and any frame data received from the video camera 115 may be accomplished using the memory 106, possibly in concert with the hard disk drivel 110. In some instances, the application program may be supplied to the user encoded on a CD-ROM or floppy disk, or alternatively may be read by the user from a network via a modem device (not illustrated). Still further, the software can also be loaded into the system 100 from other computer readable medium. Computer readable medium is taken herein to include any transmission medium for communicating the computer program between a source and a designation.

The feature tracking method 500 starts in step 501, followed by step 503 where a selection is received by the processor 105 of the location $(x_1, y_1)$ of the feature in an initial frame $A_1$. The system 100 is initialised in step 505 by setting the initial state estimate $\hat{x}_I$ and initial covariance matrix of the state estimation error $P_1$ as set out in Equations (10) and (11) respectively. The process noise and measurement noise covariance matrices Q and $\Lambda$ are also initialised. To ensure reasonably rapid locking, in the preferred implementation the velocity variance $\sigma^2$ is set to 1 and the values on the diagonal of the process noise and measurement noise covariance matrices Q and $\Lambda$ are set to 0.1. The other values of matrices Q and $\Lambda$ are set to 0.

A first position measurement $\hat{z}_I$ is also obtained as $[x_1 \ y_1]^T$. Finally, all entries of the mean feature vector $\bar{v}$ and inverse $C^{-1}$ the covariance matrix are set to 0.

Step 507 sets a number of variables used within the method 500. In particular:

variable k is set to 1, where k is used as the frame time interval;

variable lost is set to 0, where lost=0 indicates that the track has not been lost, whereas lost=1 indicates a LOT condition;

variable bdry is set to 0, where bdry=1 indicates that the feature is close to the frame boundary; and counters $S_1$, $S_2$ and $S_3$ are all set to 0.

Step 509 follows where the variable k is incremented. The data for the next frame $A_k$ is retrieved by the processor 105 in step 511 from the storage device 109 or memory unit 106. The camera-operation-induced displacement $u_k$ received by the processor 105 from an external system (not illustrated) in step 513.

The prediction step 515 follows where the processor 105 calculates the predicted state vector $\hat{x}_k^-$ and the predicted covariance matrix of the state estimation error $P_k^-$ using Equations (12) and (13) respectively.

The prediction step 515 is followed by the measurement update steps. However, it is first determined in step 517 whether a LOT condition exists by determining whether the variable lost is equal to 1. If a LOT condition does not exist, then a measurement step 519 follows where the motion vector $f_k$ and the current position measurement $z_k$ are calculated using Equations (25) and (26) respectively.

Step 519 is followed by step 521 wherein the predictions of the state vector $\hat{x}_k^-$ and the covariance matrix of the state estimation error $P_k^-$ are updated with the current measurement $z_k$ by the processor 105 using Equations (14), (15) and (16).

If step 517 determined that a LOT condition does exist, the measurement update step is bypassed in that the state vector $\hat{x}_k$ is not updated with the current measurement $z_k$, but is simply made equal to the predicted state vector $\hat{x}_k^-$ using Equation (28). The Kalman gain matrix $K_k$ and the covariance matrix of the state estimation error $P_k$ are also updated using Equations (14) and (16).

Following either of step 521 or 523, the checking for frame boundary steps follow. The processor 105 determines in step 525 whether a "close to the boundary" condition now exists by checking whether an edge of the window $W_k$ around the feature position $[\hat{x}_k \; \hat{y}_k]^T$ touches the boundary of the frame $A_k$. If a "close to the boundary" condition does exist then, in step 527, the counter $S_1$ is incremented and the variable bdry is set to 1. Counter $S_1$ keeps track of how many successive feature windows $W_k$ are too close to the boundary. Step 529 follows wherein the processor 105 determines whether the counter $S_1$ is higher than a predetermined number $p_1$. This allows for continued tracking even when the feature is near the frame boundary for up to $p_1$ frames. In the preferred implementation, the value of the predetermined number $p_1$ is set to 5. If step 529 determines that the counter $S_1$ is higher than $p_1$, then tracking is terminated on the grounds that the feature has left the frame $A_k$. Accordingly method 500 ends in step 530 with a "Out of frame" message displayed on the display 114.

If step 525 determines that a "close to boundary" condition does not exist, then it is determined in step 526 whether the variable bdry is equal to 1. If the variable bdry is equal to 1, then the counter $S_1$ is set to 0 and the variable bdry is set to 0 in step 531.

From either of step 526, 529 or 531 the method 500 continues to step 533 where the processor calculates the feature vector $v_k$ using method 400 illustrated in FIG. 4. Step 535 then uses the feature vector $v_k$ to calculate the Mahalanobis distance $t_k$ using Equation (30).

The processor 105 determines in step 537 whether a LOT condition exists by checking whether the Mahalanobis distance $t_k$ is higher than a predetermined threshold. If a LOT condition does exist, then the counter $S_2$ is incremented, and the variable lost is set to 1 in step 539. Counter $S_2$ keeps track of how many successive frames $A_k$ had a LOT condition. Step 541 follows wherein the processor 105 determines whether the counter $S_2$ is higher than a predetermined number $p_2$. This allows for continued tracking even when a LOT condition exists for a probation period of up to $p_2$ frame intervals. In the preferred implementation, the predetermined number $p_2$ is set to 5. If step 541 determines that the counter $S_2$ is higher than $p_2$, then tracking is terminated on the grounds that the track has been lost. Accordingly method 500 ends in step 542 with a "Lost Track" message displayed on the display 114.

If step 537 determines that a LOT condition does not exist, then the counter $S_2$ and variable lost are (again) set to 0 in step 543. The processor 105 also includes the feature vector $v_k$ to the reference data set in step 545 and increments counter $S_3$ on step 547. Counter $S_3$ keeps track of the number of feature windows $W_k$ whose feature vectors $v_k$ have been added to the reference data set. Step 549 follows where it is determined whether $S_3$ is equal to N, thereby checking whether the reference data set includes the required number N of feature vectors $v_k$.

If the required number N of feature vectors $v_k$ have been included in the reference data set, then the processor 105 calculates, in step 551, the mean feature vector $\bar{v}$ and the covariance matrix C using Equations (31) and (32) respectively for use in subsequent calculations of the Mahalanobis distance $t_k$ (in step 535). The counter $S_3$ is also reset to 0 in step 553.

The method 500 continues from either of steps 541, 549 or 553 to step 560 where the feature position $[\hat{x}_k \; \hat{y}_k]^T$ is appended to the trajectory of the feature. Finally, the method 500 continues to step 509 from where tracking is performed with the next frame $A_k$.

Figure 6:
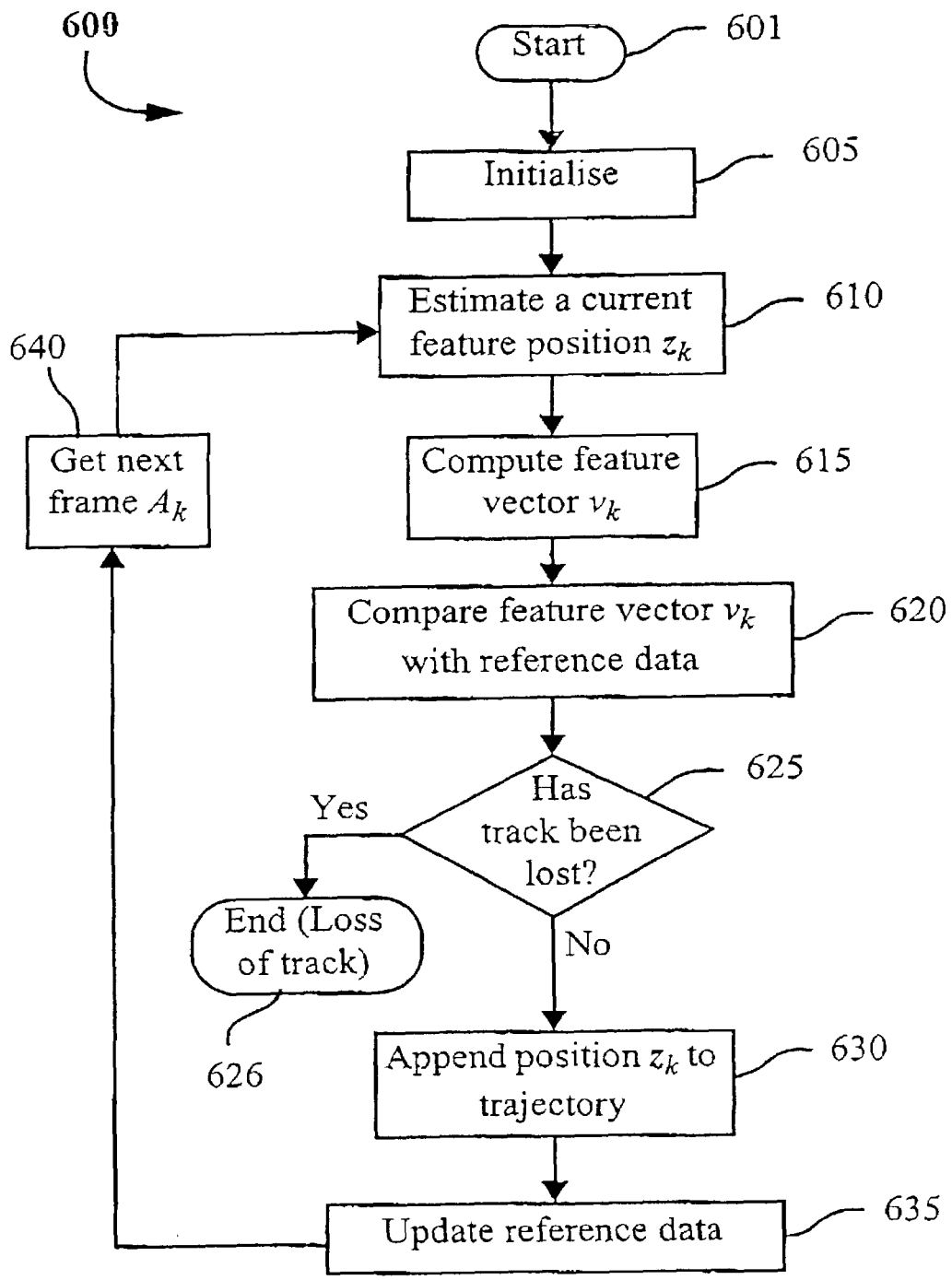
FIG. 6 is a flow diagram of an alternative feature tracking method.

FIG. 6 is a flowdiagram of an alternative feature tracking method 600 for constructing a trajectory of the feature given the sequence of frames $A_1, A_2, \ldots$, and the selected position $(x_1, y_1)$ The feature tracking method 600 starts in step 601, followed by step 605 where the system 100 is initialised. This includes receiving the location $(x_1, y_1)$ of the feature in an initial frame $A_1$, setting the initial state estimate $\hat{x}_1$, the initial covariance matrix of the state estimation error $P_1$, the process noise and measurement noise covariance matrices Q and $\Lambda$. A first position measurement $\hat{z}_l$ is also obtained as $[x_1 \; y_1]^T$. Finally, all entries of the mean feature vector $\bar{v}$ and inverse $C^{-1}$ of the covariance matrix are set to 0.

Step 610 estimates the current feature position $z_k$ as described in relation to steps 515 to 523 of method 500 (FIG. 5A).

The method 600 continues to step 615 where the processor calculates the feature vector $v_k$ using method 400 illustrated in FIG. 4. Step 620 then compares the feature vector $v_k$ with reference data. The reference data is a statistical representation of feature vectors from a plurality of previous frames.

The processor 105 determines in step 625 whether a LOT condition exists. If a LOT condition does exist, then tracking is terminated in step 626 on the grounds that the track has been lost.

Figure 5B:
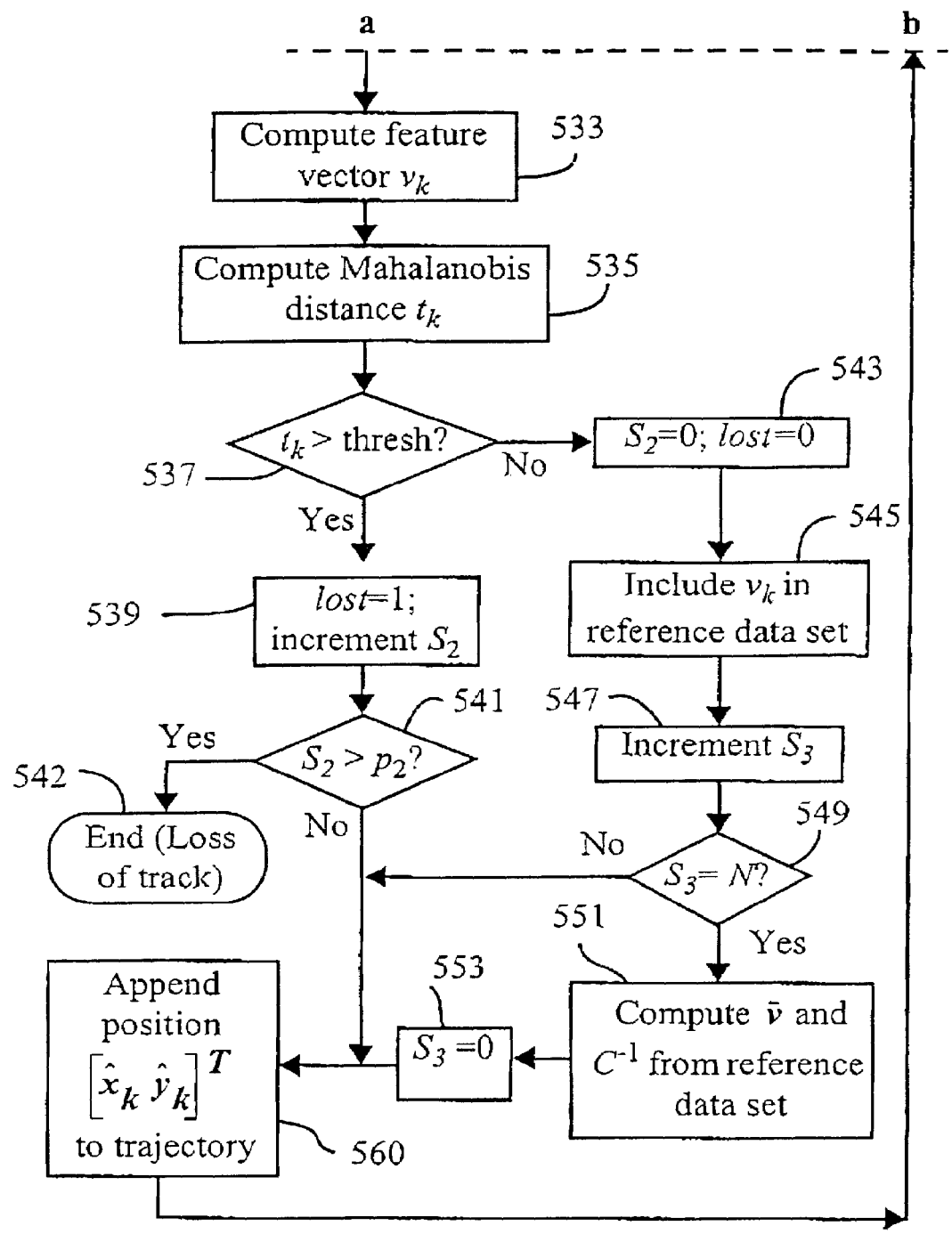

If step 625 determines that a LOT condition does not exist, then the feature position $[\hat{x}_k \; \hat{y}_k]^T$ is appended to a trajectory of the feature. The reference data is also updated in step 635 in a manner described in steps 545 to 551 in method 500 (FIG. 5B). Finally, the method 600 continues to step 640 from where tracking is performed with the next frame $A_k$.

The foregoing describes only some embodiments of the present invention, and modifications and/or changes can be made thereto without departing from the scope and spirit of the invention, the embodiment(s) being illustrative and not restrictive.

I claim:

1. A method of tracking a feature across a sequence of image frames, each said image frame comprising a two-dimensional array of pixel data, said method comprising the steps of:
   (a) estimating a current feature position in a current frame from at least a previous feature position in a previous frame;
   (b) extracting feature data from pixel data of said current frame that are substantially around said current feature position;
   (c) determining whether a first predetermined criterion has been met, said first predetermined criterion being whether a difference between said feature data and reference data is larger than a first predetermined number which indicates that track of said feature has been lost;
   (d) determining whether a second predetermined criterion has been met, said second predetermined criterion being whether a number of frames for which a loss of track has not been indicated equals a third predetermined number; and
   (e) updating said reference data with feature data of a plurality of frames upon determining that said first predetermined criterion has not been met and said second predetermined criterion has been met.

2. A method according to claim 1 wherein said reference data is a statistical representation of feature data of said plurality of frames.

3. A method according to claim 1 wherein said feature data comprises a feature vector, said reference data comprises a reference vector, step (e) comprises calculating an average of feature vectors of said plurality of frames, and step (c) comprises calculating a normalized Euclidean vector distance between said feature vector and said reference vector.

4. A method according to claim 3 wherein a covariance of the distribution of said reference data is used to calculate said normalized Euclidean vector distance between said feature vector and said reference vector.

5. A method according to claim 1 wherein steps (a) to (c) are performed on a second predetermined number of subsequent frames after said first predetermined criterion indicates that track of said feature has been lost, and steps (d) and (e) are resumed if said first predetermined criterion is not met.

6. A method according to claim 1, comprising the further step of concatenating said current feature positions to form a trajectory.

7. A method of tracking a feature across a sequence of image frames, each said image frame comprising a two-dimensional array of pixel data, said method comprising the steps of:
   (a) estimating a current feature position in a current frame from at least a previous feature position in a previous frame;
   (b) extracting feature data from pixel data of said current frame that are substantially around said current feature position, wherein said feature data comprises a feature vector, and said reference data comprises a reference vector;
   (c) determining whether a first predetermined criterion has been met, said first predetermined criterion being whether a normalized Euclidean vector distance between said feature data and reference data is larger than a first predetermined number which indicates that track of said feature has been lost;
   (d) determining whether a second predetermined criterion has been met; and
   (e) updating said reference data with feature data of a plurality of frames by calculating an average of feature vectors of said plurality of frames upon determining that said first predetermined criterion has not been met and said second predetermined criterion has been met, wherein step (b) comprises the sub-steps of:
   (b1) applying a Fast Fourier Transform to each colour component;
   (b2) concatenating magnitude coefficients from each Fast Fourier Transform to form component feature vectors; and
   (b3) concatenating said component feature vectors to form said feature vector.

8. A method according to claim 7 comprising the further sub-step performed after step (b1) and before step (b2) of:
   discarding either of first or third quadrant coefficients of each Fast Fourier Transform, and either of second or fourth quadrant coefficients of each Fast Fourier Transform.

9. A method according to claim 7 comprising the further sub-step performed after step (b1) and before step (b2) of:
   discarding coefficients of each Fast Fourier Transform having either a horizontal or vertical spatial frequency component above $\pi/2$.

10. A method according to claim 7 comprising the further sub-step performed after step (b1) and before step (b2) of:
    normalizing coefficients of each Fast Fourier Transform with luminance data of said pixel data.

11. A method according to claim 9 comprising the further sub-step performed before step (b1) of:
    multiplying each colour component of said pixel data by a window function.

12. A method according to claim 11 wherein said window function is a Hanning function.

13. An apparatus for tracking a feature across a sequence of image frames, each said image frame comprising a two-dimensional array of pixel data, said apparatus comprising:
    means for estimating a current feature position in a current frame from at least a previous feature position in a previous frame;
    means for extracting feature data from pixel data of said current frame that are substantially around said current feature position;
    means for determining whether a first predetermined criterion has been met, said first predetermined criterion being whether a difference between said feature data and reference data is larger than a first predetermined number which indicates that track of said feature has been lost;
    means for determining whether a second predetermined criterion has been met, said second predetermined criterion being whether a number of frames for which a loss of track has not been indicated equals a third predetermined number; and
    means for updating said reference data with feature data of a plurality of frames upon determining that said first predetermined criterion has not been met and said second predetermined criterion has been met.

14. An apparatus according to claim 13 wherein said reference data is a statistical representation of feature data of said plurality of frames.

15. An apparatus according to claim 13 wherein said feature data comprises a feature vector, said reference data comprises a reference vector, said means for updating said reference data calculates an average of feature vectors of said plurality of frames, and said means for determining calculates a normalized Euclidean vector distance between said feature vector and said reference vector.

16. An apparatus according to claim 15 wherein a covariance of the distribution of said reference data is used to calculate said normalized Euclidean vector distance between said feature vector and said reference vector.

17. An apparatus according to claim 13 wherein, after said first predetermined criterion indicates that track of said feature has been lost, said current feature position is estimated, and said feature data is extracted and said first predetermined criterion is determined for a second predetermined number of subsequent frames, and said reference data is updated if said first predetermined criterion is not met and said second predetermined criterion is met.

18. An apparatus according to claim 13 further comprising means for concatenating said current feature positions to form a trajectory.

19. An apparatus for tracking a feature across a sequence of image frames, each said image frame comprising a two-dimensional array of pixel data, said apparatus comprising:
   means for estimating a current feature position in a current frame from at least a previous feature position in a previous frame;
   means for extracting feature data from pixel data of said current frame that are substantially around said current feature position, wherein said feature data comprises a feature vector, and said reference data comprises a reference vector;
   means for determining whether a first predetermined criterion has been met, said first predetermined criterion being whether a normalized Euclidean vector distance between said feature data and reference data is larger than a first predetermined number which indicates that track of said feature has been lost;
   means for determining whether a second predetermined criterion has been met; and
   means for updating said reference data with feature data of a plurality of frames by calculating an average of feature vectors of said plurality of frames upon determining that said first predetermined criterion has not been met and said second predetermined criterion has been met,
   wherein said means for extracting feature data comprises:
   (a) means for applying a Fast Fourier Transform to each colour component;
   (b) means for concatenating magnitude coefficients from each Fast Fourier Transform to form component feature vectors; and
   (c) means for concatenating said component feature vectors to form said feature vector.

20. A computer readable medium comprising a program for tracking a feature across a sequence of image frames, each said image frame comprising a two-dimensional array of pixel data, said program comprising:
   code for estimating a current feature position in a current frame from at least a previous feature position in a previous frame;
   code for extracting feature data from pixel data of said current frame that are substantially around said current feature position;
   code for determining whether a first predetermined criterion has been met, said first predetermined criterion being whether a difference between feature data and said reference data is larger than a first predetermined number which indicates that track of said feature has been lost;
   code for determining whether a second predetermined criterion has been met, said second predetermined criterion being whether a number of frames for which a loss of track has not been indicated equals a third predetermined number; and
   code for updating said reference data with feature data of a plurality of frames upon determining that said first predetermined criterion has not been met and said second predetermined criterion has been met.

21. A computer readable medium according to claim 20 wherein said reference data is a statistical representation of feature data of said plurality of frames.

22. A computer readable medium according to claim 20 wherein said feature data comprises a feature vector, said reference data comprises a reference vector, said code for updating said reference data calculates an average of feature vectors of said plurality of frames, and said code for determining calculates a normalized Euclidean vector distance between said feature vector and said reference vector.

23. A computer readable medium according to claim 22 wherein a covariance of the distribution of said reference data is used to calculate said normalized Euclidean vector distance between said feature vector and said reference vector.

24. A computer readable medium according to claim 20 wherein, after said first predetermined criterion indicates that track of said feature has been lost, said current feature position is estimated, and said feature data is extracted and said first predetermined criterion is determined for a second predetermined number of subsequent frames, and said reference data is updated if said first predetermined criterion is not met and said second predetermined criterion is met.

25. A computer readable medium according to claim 20, further comprising code for concatenating said current feature positions to form a trajectory.

26. A computer readable medium comprising a program for tracking a feature across a sequence of image frames, each said image frame comprising a two-dimensional array of pixel data, said program comprising:
   code for estimating a current feature position in a current frame from at least a previous feature position in a previous frame;
   code for extracting feature data from pixel data of said current frame that are substantially around said current feature position, wherein said feature data comprises a feature vector, and said reference data comprises a reference vector;
   code for determining whether a first predetermined criterion has been met, said first predetermined criterion being whether a normalized Euclidean vector distance between said feature data and reference data is larger than a first predetermined number which indicates that track of said feature has been lost;
   code for determining whether a second predetermined criterion has been met; and
   code for updating said reference data with feature data of a plurality of frames by calculating an average of feature vectors of said plurality of frames upon determining that said first predetermined criterion has not been met and said second predetermined criterion has been met,
   wherein said code for extracting feature data comprises:
   (a) code for applying a Fast Fourier Transform to each colour component;
   (b) code for concatenating magnitude coefficients from each Fast Fourier Transform to form component feature vectors; and
   (c) code for concatenating said component feature vectors to form said feature vector.

* * * * *

UNITED STATES PATENT AND TRADEMARK OFFICE
CERTIFICATE OF CORRECTION

PATENT NO. : 7,177,446 B2  Page 1 of 1
APPLICATION NO. : 10/207140
DATED : February 13, 2007
INVENTOR(S) : Julian Frank Andrew Magarey It is certified that error appears in the above-identified patent and that said Letters Patent is hereby corrected as shown below:

COLUMN 3:
Line 51, "to presented" should read --presented--.

COLUMN 5:
Line 22, "font" should read --form--.

COLUMN 12:
Line 29, "drivel" should read --drive--.

COLUMN 16:
Line 28, "9" should read --7--.

Signed and Sealed this

Thirtieth Day of October, 2007

JON W. DUDAS
*Director of the United States Patent and Trademark Office*